Aug. 11, 1959   H. G. JUNGK   2,899,574
CONSTRUCTION FOR FORMING COMMUTATOR SEGMENTS
Filed Jan. 17, 1957   2 Sheets-Sheet 1

INVENTOR.
Herbert G. Jungk.
BY Schmieding and Fultz
ATTORNEYS

Aug. 11, 1959  H. G. JUNGK  2,899,574
CONSTRUCTION FOR FORMING COMMUTATOR SEGMENTS
Filed Jan. 17, 1957  2 Sheets-Sheet 2

INVENTOR.
Herbert G. Jungk.
BY Schmieding and Fultz
ATTORNEYS

United States Patent Office 2,899,574
Patented Aug. 11, 1959

2,899,574

CONSTRUCTION FOR FORMING COMMUTATOR SEGMENTS

Herbert G. Jungk, Columbus, Ohio, assignor, by mesne assignments, to McGraw-Edison Company, a corporation of Delaware Application January 17, 1957, Serial No. 634,729

14 Claims. (Cl. 310—234)

The present invention relates to commutators for rotating electrical machines and particularly to the commutator segment of novel construction and a method for producing same.

In general, certain types of commutator segments, to which the present invention applies, include a main portion, including a brush surface, and a riser portion. The riser portion is generally provided with a slot which receives the leads from the armature coils so as to electrically connect the armature windings to carbon brushes that ride on the brush surface. Commutator segments of this type generally include V grooves for receiving V rings whereby the segments are retained in assembled relationship on the periphery of the hub of the armature.

The present invention applies to the construction of commutators in which it is often necessary to incorporate a commutator segment construction comprising a riser portion and a main bar portion of trapezoidal cross-sectional shape increasing in thickness radially outwardly with a thicker outer portion of the riser being provided with a slot to receive armature coil ends so as to connect the armature windings to carbon brushes which ride on the brush surface formed by the outer edges of the main bar portion of the commutator segments. In armatures of this type the bar portions and riser portions of the commutator segments are separated by flat mica segments which provide insulation therebetween.

In the case of electrical machines, employing commutators with wide segments, it is common practice to form riser portions of the segments of thin sheet material and use the air space or inserted insulating means for insulation between the segments. The present invention may be applied to such instances of wide segments by replacing the thin sheet metal riser portions with two hollow riser halves, each being bent from thin sheet material, which halves when joined together form a riser portion that increases in thickness radially outwardly to fill the included angular space defined by the main portion of the segment. Such two hollow sheet metal riser halves are further shaped to form a slot, at the junction of their confronting surfaces, for receiving the armature coil ends as described before.

In general, the present invention comprises producing commutator segments of the above mentioned type which are of composite construction wherein a riser portion of the segment is secured to a bar portion of the segment in a novel manner to provide an improved segment with a savings in the amount of material required to fabricate same.

It is therefore an object of the present invention to provide an improved commutator segment of novel construction which is formed in a manner that eliminates wasting of metal stock from which the segments are formed.

It is another object of the present invention to provide an improved construction for a commutator segment of the type having a slotted riser wherein an improved slot is formed at a considerable savings in cost of fabrication.

It is another object of the present invention to provide an improved commutator segment of composite construction having a riser portion secured to a main bar portion, said riser portion having an axis of work hardening disposed transversely to an axis of work hardening of said main bar portion so as to provide a segment of increased strength.

It is another object of the present invention to provide an improved commutator of the type which includes a plurality of commutator segments assembled on a hub. The segments each contain a V groove on each end thereof and the hub carries V rings inserted into said V grooves and wedgingly engaging only the inner edges of said V grooves to form an arch-bound construction. With such arch-bound construction the outer edges of the V grooves are spaced from the outer surfaces of the V rings, and also spaced from the layer of dielectric material carried thereon, whereby the ends of the commutator segments, and the riser portions attached thereto, are held together in equilibrium by arching pressure only.

Further objects and advantages of the present invention will be apparent from the following description, reference being had to the accompanying drawings wherein a preferred form of embodiment of the invention is clearly shown.

Figure 1:
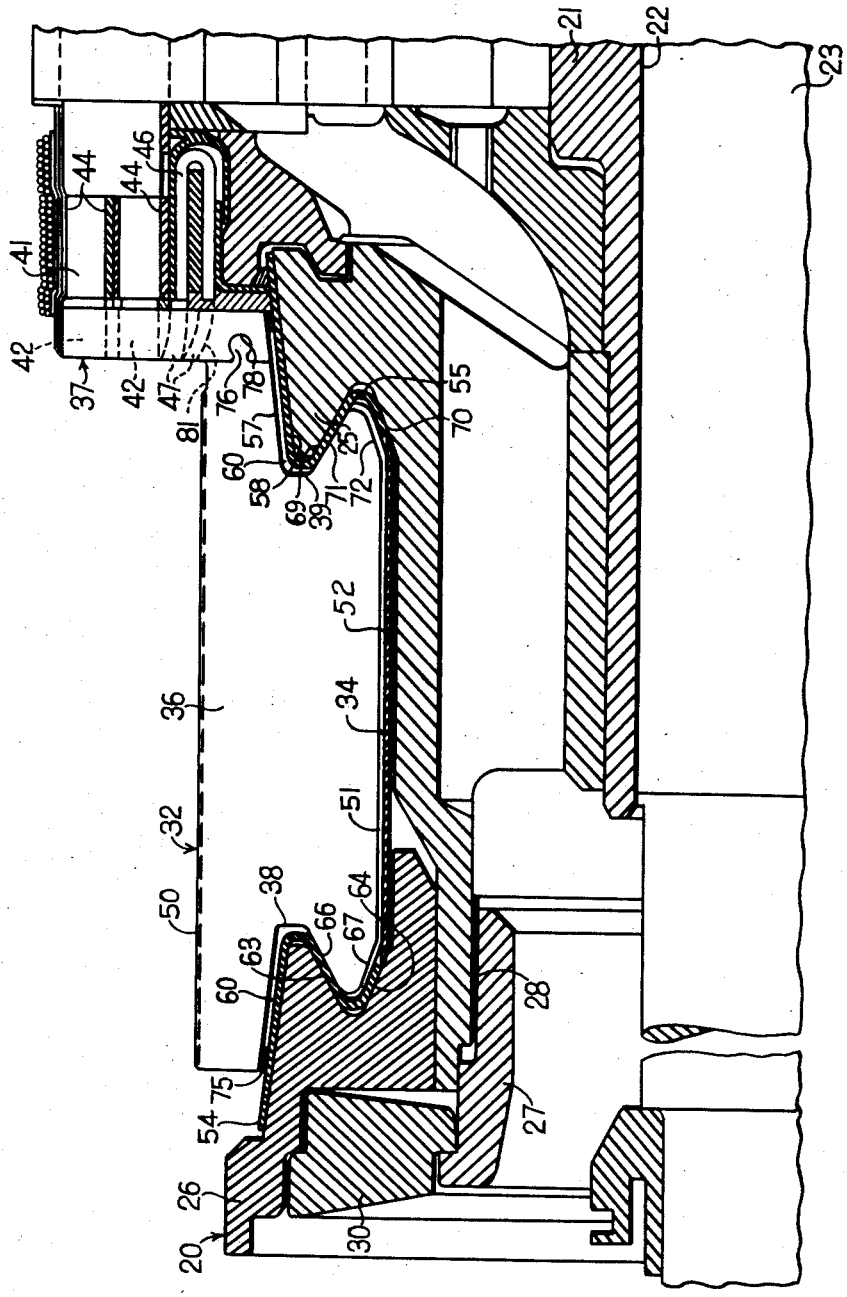
Figure 1 is a partial side sectional view of a commutator constructed according to the present invention with the section being taken along a plane passing through the axis of rotation of the commutator.
Figure 3:
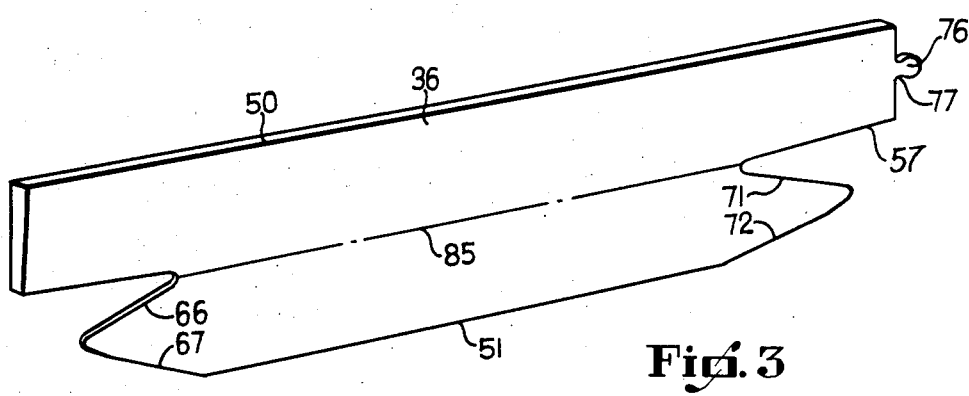
Figure 4:
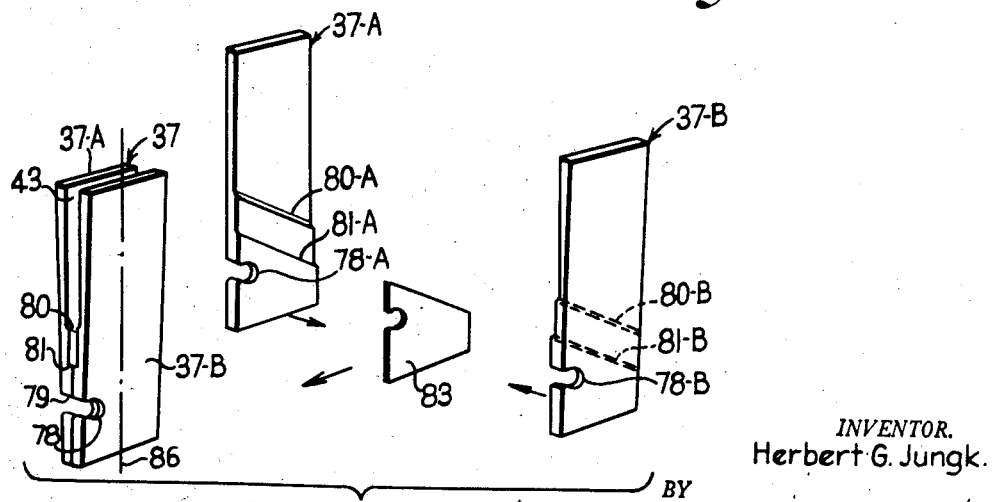

Figure 3 is a perspective view of a main bar portion of a commutator segment utilized in the commutator of the preceding figures; and Figure 4 is an exploded perspective view of a riser portion of a commutator segment constructed according to the present invention, said riser portion being adapted to be joined to the main bar portion of Figure 3 to form the composite commutator segment illustrated in Figure 1.

Referring in detail to the drawing, Figure 1 illustrates a commutator indicated generally at 20 which includes a hub portion 21 having a bore 22 through which is extended a shaft 23. Hub 21 includes a portion forming a rear V ring 25 and a removable portion forming a front V ring 26. A ring nut 27 is screwed into a hole in hub portion 21 at a threaded junction 28. A spring ring 30 is disposed between ring nut 27 and front V groove 26. When ring nut 27 is screwed into the hole in hub portion 21 the front V ring 26 is moved towards rear V ring 25.

Figure 2:
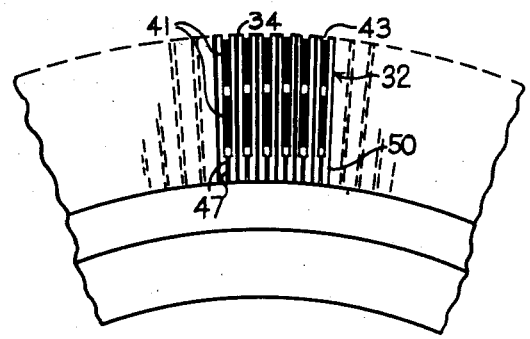
Figure 2 is a partial end view of the commutator of Figure 1 viewed from the left end thereof as is indicated by the arrows 2—2 of Figure 1.

A plurality of commutator segments, one of which is indicated generally at 32 in Figure 1, are mounted on the periphery of hub 21. As seen in Figure 2, the segments 32 are separated one from the other by means of a plurality of mica segments 34. Each of the commutator segments 32 includes a main bar portion 36 to which is joined a riser portion indicated generally at 37. Each of the commutator segments 32 includes a front V groove 38 and a rear V groove 39 for receiving front V ring 26 and rear V ring 25, respectively.

With continued reference to Figure 1, the apparatus includes a plurality of armature coils 41 having armature coil ends 42 extended into slots 43 formed in riser portions 37. Armature winding material 44 is provided at the coils 41 in the conventional manner. The apparatus further includes a plurality of equilizers 46 which include equalizer ends 47 extended into the lower portions of slots 43 formed in riser portions 37.

With continued reference to Figure 1, commutator segments 32 each include an outer brush surface 50 and inner edge 51. A cylindrical mica bushing 52 is disposed between the outer periphery of hub 21 and the inner edge 51 of mica segments 32. A mica cone V ring 54 is disposed between front V groove 38 and front V ring 26, and in a similar manner, a mica cone V ring 55 is disposed between rear V groove 39 and rear V ring 25. Each of V grooves 38 and 39 of commutator segment 32 includes an outer edge 57 that is spaced radially outwardly from an outer surface 58 of mica cone V ring 54 or 55 to form a clearance space 60. When ring nut 27 is tightened inwardly, and front V ring 26 is moved rearwardly towards rear V ring 25, inclined surface 63 on front V ring is wedged against mica cone V ring 54 so as to tightly grip surface 66 of commutator segment 32. In a like manner, surface 69 on rear V ring 25 is wedged against mica cone V ring 55 to tightly grip surface 71 of commutator segment 32.

It will be understood that since commutator segment 32 is tightly retained by wedging action at surfaces 63 and 66 and surfaces 69 and 71 in the manner described above, and due to the presence of the clearance spaces 60 between the commutator segments and the outer surface of the mica cone V rings 54 and 55, the end portions of the commutator segments 32 radially outwardly of the V grooves, and the riser portions 37 secured thereto, are pulled together tightly by arch binding so that no further support is required between the outer edge 57 and the riser 37.

As seen in Figure 1, annular seals 75 are provided between surfaces formed by edges 57 of the commutator segments 32 and the outer surfaces of mica cone V rings 54 and 55. Such seals 75 may be formed by a suitable material of gummy consistency such as a product known to the trade as Silasticseal.

Reference is next made to Figures 3 and 4 which should be considered together as they illustrate the composite construction for the commutator segment 32 of Figures 1 and 2. As seen in Figure 4, the riser assembly 37 comprises portions 37-A and 37-B which are provided with recessed portions 78-A and 78-B. When the riser portions 37-A and 37-B are joined together to form riser assembly 37 the recessed portions 78-A and 78-B register one with the other to form the recess 78 for the assembly which receives a protrusion 76 formed on the end of main bar portion 36 of Figure 3. Protrusion 76 includes a necked portion 77 that conforms with the reduced entrance 79 of recess 78 of the riser assembly to form an interlocked junction between riser assembly 37 and main bar portion 36. After the portions 37-A, 37-B and 36 have been assembled by inserting protrusion 76 into recessed portions 78-A and 78-B the junction is heated and a fuseable metallic substance such as solder or welding material is applied to the junction.

If desired, when the two portions 37-A and 37-B of the riser assembly are joined, a thin sheet 83 of fuseable material, such as solder or welding material, may be placed between the confronting faces of riser portions 37-A and 37-B to insure the confronting surfaces of the riser portions are completely covered with the fuseable material whereby a strong junction is achieved.

As seen in Figure 3, the main bar portion 36 includes a longitudinal axis 85 which represents the direction of rolling or cold working of the metal blank from which such bar portion is formed. Similarly, riser assembly 37 includes a longitudinal axis 86 which represents the direction of rolling or cold working of the metal blank from which the riser portions 37-A and 37-B are formed. Hence the portions of segment 32 can be formed and assembled such that the axes of rolling or work hardening of the riser portions and main bar portion are disposed transversely of one another. Many metals, and particularly copper alloys which are commonly used for commutator segments, possess, after being subjected to work hardening, different strength properties in a direction transverse to the axis of work hardening as compared to the strength properties in the direction of work hadening. Hence it will be understood that with the composite construction for the commutator segment of Figures 3 and 4 the respective axes of the components can be disposed transversely of one another to achieve maximum strength for the main bar portion 36 and also maximum strength for the riser assembly 37.

As an additional advantage of the present method and construction, the riser portions 37-A and 37-B can each be formed by coining or pressing to achieve perfectly smooth sides for slot 43 and, in addition, the upper spaced portions of the riser assembly that form the slot can be formed of equal thickness. By prior practices, slots, such as 43, in risers of segments have been cut into the upper portion of such risers by machining methods and in such prior instances it has been impossible to achieve smooth slot sides of equal thickness on a production basis. This difficulty has resulted from the characteristic of thin machine cutters to deviate from the intended path of cut, and from the resulting machine marks produced by the machine cutters on the confronting sides of the slots.

In the preferred form of the composite segment construction of the present invention it is desirable to form the lower surfaces 80 and 81 of groove 43 so as to be inclined downwardly and outwardly, in the manner illustrated, so as to accommodate the upswing of the equalizer ends 47 as seen in Figure 1. Hence it is desirable to extend the lower portion of the riser assembly 37 as far radially inwardly from brush surface 50 as is possible in order to provide room for inclined slot surfaces 81 and the interlock recess 78. Hence in the preferred form illustrated the bottom edge of the riser assembly is made a continuation of edge 57 of V groove 39 of the main body portion 36. In cooperation with such riser construction, the space 60 is provided and maintained in a manner previously described, to isolate the lower end of riser assembly 37, and hence the junction of the riser assembly and main bar portion from any unequally distributed stresses which might otherwise be applied were the lower ends of the riser assemblies 37 allowed to contact the outer surfaces of mica V cone 55 on V ring 25 and hence oppose the arching action and disturb the brush surface.

As an important advantage of the construction of the present invention, the main bar portion 36 of Figure 3 can be cut from strips of metal stock which need be only as wide as the main bar portion 36, instead of as wide as the main bar portion 36 plus the height of the riser assembly 37. It will be understood that according to prior practices where the main bar portion and riser portion have been cut or stamped from the same strip of stock, the stock was necessarily wide and the cut out portion above the brush surface 50 was necessarily a scrap piece of relatively large dimensions. By employing the composite construction of the present invention, however, a strong segment construction is achieved and, at the same time, the scrap material incident to the fabricating of the segment, is very materially reduced.

It will be understood that in electrical machines having wide commutator segments the general riser construction of Figure 4 can be employed but instead of using solid riser halves 37-A and 37-B, the riser halves can each be formed of thin sheet metal stock to form hollow wide riser halves of the same general exterior configuration as the solid riser halves 37-A and 37-B illustrated.

While the form of embodiment of the present invention as herein disclosed constitutes a preferred form, it is to be understood that other forms might be adopted, all coming within the scope of the claims which follow,

I claim:

1. A commutator segment comprising a bar portion including a longitudinal brush surface and a lateral edge forming a junction portion; a first riser portion; a second riser portion, said two riser portions including spaced confrontnig surfaces defining a slot and edges abutting said lateral edge to form a laterally extending junction; and means for joining said riser portions together and to said bar portion, said means including a protrusion on certain of said edges and a recess in certain other of said edges, said protrusion being extended in a longitudinal direction transversely of said laterally extending junction and disposed in said recess.

2. A commutator segment comprising a bar portion including a longitudinal brush surface and a lateral edge forming a junction portion; a first riser portion; a second riser portion, said two riser portions including spaced confronting surfaces defining a slot and edges abutting said lateral edge to form a laterally extending junction; and means for joining said riser portions together and to said bar portion, said means including a protrusion on certain of said edges, said protrusion being extended in a longitudinal direction transversely of said laterally extending junction and including a neck portion and a head portion, and a recess in certain other of said bar and riser portions, said recess including an entrance of reduced size for receiving said neck portion and retaining said head portion to form a locked junction.

3. A commutator segment comprising a bar portion including side surfaces, a longitudinal brush surface, and a lateral edge forming a junction portion; a riser portion including a slot, side surfaces coextensive with said side surfaces of said bar portion, and an edge abutting said lateral edge to form a laterally extending junction; and means at the junction of said portions including a recess in one of said portions and open to an edge and side surface of said portion, and a protrusion on the other of said portions and extended in a longitudinal direction transversely of said laterally extending junction and, said protrusion being mounted in said recess by insertion in the side opening to said recess.

4. A commutator segment comprising a bar portion including side surfaces, a longitudinal brush surface, and a lateral edge forming a junction portion; a riser portion including a slot, side surfaces coextensive with said side surfaces of said bar portion, and an edge abutting said lateral edge to form a laterally extending junction, one of said portions including a recess having an entrance in one of said edges of reduced size as compared to an entrance in one of said sides, and the other of said portions including a protrusion having a necked portion of reduced size as compared to an outer portion thereof, said protrusion being extended in a longitudinal direction transversely of said laterally extending junction and mounted in said recess by sidewise insertion of said neck in said entrance and by sidewise insertion of outer portion in said inner portion.

5. A commutator segment comprising a bar portion including side surfaces, a longitudinal brush surface and a V groove having inner and outer edges; a riser portion secured to an end of said bar portion, said riser portion including side surfaces coextensive with said side surfaces of said bar portion and an inner edge aligned with said outer edge of said V groove and said riser portion including an open ended slot for receiving a coil end having a longitudinally extending bottom surface inclined relative to said brush surface, at least a portion of said bottom surface being disposed inwardly of said brush surface; and means for securing said portions together; said means including a recess in one of said portions having an entrance in a side surface of said portions, and a protrusion on the other of said portions, said protrusion being inserted in said entrance in said side surface.

6. A commutator segment comprising a bar portion including a longitudinal brush surface, a lateral edge forming a junction portion, and a V groove having inner and outer edges; a riser portion including an edge secured to said lateral edge of said bar portion, said riser portion including an inner edge aligned with said outer edge of said V groove and said riser portion including an open ended slot for receiving a coil end having a longitudinally extending bottom surface inclined relative to said brush surface, at least a portion of said bottom surface being disposed inwardly of said brush surface; and means for securing said portions together, said means including a protrusion on certain of said portions and a recess in certain other of said portions, said protrusion being extended in a longitudinal direction transversely of said laterally extending junction and disposed in said recess.

7. A commutator segment comprising a bar portion including a longitudinal brush surface and a V groove having inner and outer edges; a riser portion secured to an end of said bar portion, said riser portion including an inner edge aligned with said outer edge of said V groove and said riser portion including an open ended slot having a longitudinally extending bottom surface inclined relative to said brush surface, at least a portion of said bottom surface being disposed inwardly of said brush surface; and means for securing said portions together, said means including a protrusion on certain of said bar and riser portions, said protrusion including a neck portion and a head portion, and a recess in certain other of said bar and riser portions, said recess including an entrance of reduced size for receiving said neck portion and retaining said head portion to form a locked junction.

8. The construction defined in claim 5 characterized by said riser portion being formed from two pieces having spaced confronting surfaces forming sides of said slot.

9. The construction defined in claim 6 characterized by said riser portion being formed from two pieces having spaced confronting surfaces forming sides of said slot.

10. The construction defined in claim 7 characterized by said riser portion being formed from two pieces having spaced confronting surfaces forming sides of said slot.

11. A commutator comprising, in combination, a hub; a plurality of segments assembled on the periphery of said hub, each of said segments including a bar portion having a front V groove and a rear V groove, said rear V groove including an outer edge and an inner edge; a front V ring carried by said hub and disposed in said front V groove; a rear V ring carried by said hub and disposed in said rear V groove, said rear V ring including an outer surface; a sheet of dielectric material overlying the outer surface of said rear V ring; a riser portion secured to the rear end of said bar portion, said riser portion including an inner edge aligned with said outer edge of said rear V groove, said inner and outer edges being spaced from said dielectric material; a ring-shaped seal between said aligned edges and said dielectric material; and means for securing said riser portion to said bar portion, said riser portion being formed from two pieces having spaced confronting surfaces forming sides of a slot.

12. The construction defined in claim 11 characterized by said bar portion including a brush surface, and by said riser portion including a slot having a bottom surface inclined relative to said brush surface, at least a portion of said bottom surface of said slot being disposed inwardly of said brush surface.

13. The steps in the method of forming a commutator segment which method comprises forming a bar portion for said segment, said bar portion including a longitudinal brush surface and a lateral edge; forming, by coining a metal blank, a first riser portion having a junction edge, a junction forming surface, and a slot-forming surface off-set from said junction forming surface by said coining; forming, by coining a metal blank, a second riser portion having a junction edge, a junction forming surface, and a slot forming surface off-set from said junction forming surface by said coining; and joining said riser portions together in assembled relationship on an end of said bar portions by laterally inserting a longitudinal protrusion on certain of said portions in a longitudinal groove in certain of said other portions to a position wherein said junction edges abut said lateral edge.

14. The steps in the method of forming a commutator segment which method comprises forming a bar portion having a longitudinal brush surface and a lateral edge from metallic stock, said bar portion including an axis coextensive with a direction of work hardening; forming, by coining a metal blank, a first riser portion, said first riser portion including a junction edge and an axis coextensive with a direction of work hardening, a junction forming surface, and a slot forming surface off-set from said slot forming surface by said coining; forming, by coining a metal blank, a second riser portion, said second riser portion including a junction edge and an axis coextensive with a direction of work hardening, a junction forming surface, and a slot forming surface off-set from said slot forming surface by said coining; and joining said riser portions in assembled relationship on an end of said bar portion with said axes of said riser portions disposed transversely of said axis of said bar portion by laterally inserting a longitudinal projection on one of said portions into a longitudinal groove in the other of said portions.

References Cited in the file of this patent

UNITED STATES PATENTS

| | | |
|---|---|---|
| 1,030,013 | Ralston | June 18, 1912 |
| 1,297,903 | Phillips | Mar. 18, 1919 |
| 1,357,016 | Zimmerman | Oct. 26, 1920 |
| 2,351,021 | Dick | June 13, 1944 |

FOREIGN PATENTS

| | | |
|---|---|---|
| 590,957 | France | Mar. 30, 1925 |
| 672,631 | Great Britain | May 21, 1952 |

OTHER REFERENCES

Serial No. 319,356, Zollner (A.P.C.), published May 18, 1943.